(12) United States Patent
Kotake et al.

(10) Patent No.: US 9,079,376 B2
(45) Date of Patent: Jul. 14, 2015

(54) PREPREG, LAMINATE OBTAINED WITH THE SAME AND PRINTED-WIRING BOARD

(75) Inventors: Tomohiko Kotake, Ibaraki (JP); Masato Miyatake, Ibaraki (JP); Shunsuke Nagai, Ibaraki (JP); Hiroyuki Izumi, Ibaraki (JP); Shinji Tsuchikawa, Ibaraki (JP); Shin Takanezawa, Ibaraki (JP); Hikari Murai, Ibaraki (JP)

(73) Assignee: Hitachi Chemical Company, Ltd., Tokyo (JP)

(\*) Notice: Subject to any disclaimer, the term of this patent is extended or adjusted under 35 U.S.C. 154(b) by 0 days.

(21) Appl. No.: 13/352,783

(22) Filed: Jan. 18, 2012

(65) Prior Publication Data

US 2012/0237751 A1   Sep. 20, 2012

Related U.S. Application Data

(60) Provisional application No. 61/433,727, filed on Jan. 18, 2011.

(51) Int. Cl.
*B32B 17/00* (2006.01)
*B32B 17/02* (2006.01)
*B32B 25/20* (2006.01)
(Continued)

(52) U.S. Cl.
CPC ... *B32B 5/26* (2013.01); *B32B 5/28* (2013.01); *B32B 15/14* (2013.01); *B32B 15/20* (2013.01); *C08J 5/24* (2013.01); *B32B 2250/04* (2013.01); *B32B 2250/40* (2013.01); *B32B 2260/023* (2013.01); *B32B 2260/046* (2013.01); *B32B 2262/101* (2013.01); *B32B 2307/206* (2013.01); *B32B 2307/734* (2013.01); *B32B 2457/08* (2013.01); *C08J 2300/24* (2013.01)

(58) Field of Classification Search
CPC ...... C04B 14/00; C08L 83/04; C08G 18/289; C08G 77/04; C08G 77/12; C08G 77/14; C08G 77/20; C08G 77/38; C08G 77/70; C03C 25/40; C08K 9/06; C08K 3/34
USPC .................. 428/391, 405, 357, 364, 375
See application file for complete search history.

(56) References Cited

U.S. PATENT DOCUMENTS 5,135,993 A \* 8/1992 Decker et al. ............. 525/476
5,670,250 A \* 9/1997 Sanville et al. ............ 428/323
2008/0105375 A1\* 5/2008 Gordon et al. ............. 156/321

FOREIGN PATENT DOCUMENTS

JP   07-148885   6/1995

OTHER PUBLICATIONS

Chinese Official Action dated Jan. 27, 2015, for CN Application No. 201280005777.6.

*Primary Examiner* — Matthew Matzek
(74) *Attorney, Agent, or Firm* — Fitch Even Tabin & Flannery

(57) ABSTRACT

Disclosed is a prepreg including a fiber substrate and a layer made of a thermosetting resin composition, wherein the layer made of a thermosetting resin composition contains a modified silicone oil or a compound having a skeleton derived from a modified silicone oil, and the layer made of a thermosetting resin composition has a phase separation structure.
A prepreg having excellent low thermal expansion properties and warpage characteristics which are difficult to be realized by using only a conventional resin which is effective for highly filling an inorganic filler or has a low coefficient of thermal expansion, and a laminate using the same, and a printed wiring board can be provided.

22 Claims, 1 Drawing Sheet

PHASE SEPARATION DIAGRAM (2,000 TIMES)

(51) Int. Cl.
*B32B 5/26* (2006.01)
*B32B 5/28* (2006.01)
*B32B 15/14* (2006.01)
*B32B 15/20* (2006.01)
*C08J 5/24* (2006.01)

PHASE SEPARATION DIAGRAM (2,000 TIMES)

PHASE SEPARATION DIAGRAM (10,000 TIMES)

PREPREG, LAMINATE OBTAINED WITH THE SAME AND PRINTED-WIRING BOARD

This application is a non-provisional application claiming priority to prior U.S. Provisional Application No. 61/433,727.

TECHNICAL FIELD

The present invention relates to a prepreg which is suitable for semiconductor packages and printed wiring boards, and also to a laminate obtained from the same, and a printed wiring board.

BACKGROUND ART

Associated with a trend toward miniaturization and high performance of electronic device in recent years, in printed wiring boards, density growth and high integration of the wiring density is developed. Along with this, there is an increased demand for enhancement of reliability by increasing the heat resistance of laminates for wiring. In particular, with regarding to the package substrates for semiconductor, a low coefficient of thermal expansion is demanded, since at the time of component mounting or package assembling, a warpage resulting from a difference in the thermal expansion coefficient between a chip and a substrate is a large problem.

In general, a laminate for printed wiring board is obtained as follows; applying a resin composition which is mainly composed of an epoxy resin onto a glass woven fabric to obtain a prepreg, laminating one or more sheets of this, disposing a copper foil, and heat curing by pressing. The epoxy resin is generally excellent in a balance among insulating properties, heat resistance, costs, and the like. However its coefficient of thermal expansion is large, so that it is attempted to reduce its thermal expansion by choosing an epoxy resin having an aromatic ring or highly filling an inorganic filler such as silica, etc. (see Patent Documents 1 and 2). By filling the inorganic filler in a high proportion, it is also possible to further reduce a coefficient of thermal expansion; however, it is known that an increase of the filling amount of the inorganic filler causes a lowering of insulation reliability resulting from moisture absorption, an insufficient adhesive force between the resin composition layer and the wiring layer, and a failure of press molding. Besides, there is known a method in which an inorganic filler is uniformly dispersed by using a silicone polymer, thereby achieving high filling (see Patent Document 3). However, in an application in a multi-layered wiring board, there was a limit in lowering the coefficient of the thermal expansion by achieving high filling by the inorganic filler.

In addition, it is attempted to realize the low coefficient of thermal expansion by choosing or improving a resin. For example, as known examples of an epoxy resin having an aromatic ring, there is a curable resin composition using an epoxy resin having a naphthalene skeleton (Patent Document 4). Also, conventionally, for lowering the coefficient of thermal expansion of a resin composition for wiring board, as shown in Patent Documents 5 and 6, a method in which a crosslinking density is increased to increase Tg, thereby lowering the coefficient of thermal expansion is general. However, the increase of the crosslinking density shortens a molecular chain between functional groups, and shortening of the molecular chain to a certain extent or more is difficult from the standpoints of reactivity, resin strength, and the like. For this reason, there was a limit in lowering the coefficient of thermal expansion by a method for increasing the crosslinking density.

Also, even in the case of lowering the coefficient of thermal expansion as above mentioned, there was a problem that a warpage was caused due to an internal stress in the manufacturing process at the time of solder mounting, resulting in a connection failure.

PRIOR ART DOCUMENTS

Patent Documents

[Patent Document 1] JP-A-5-148343
[Patent Document 2] Japanese Patent No. 2740990
[Patent Document 3] Japanese Patent No. 2904311
[Patent Document 4] Japanese Patent No. 4591801
[Patent Document 5] JP-A-2000-243864
[Patent Document 6] JP-A-2000-114727

SUMMARY OF THE INVENTION

Problems to be Solved by the Invention

The present invention is intended to provide a prepreg having excellent low thermal expansion properties and warpage characteristics which are difficult to achieve by using only a conventional resin which is effective for highly filling an inorganic filler or obtaining a low coefficient of thermal expansion and a laminate using the same, and a printed wiring board.

Means for Solving the Problems

In order to solve the above-mentioned problems, the present inventors made extensive and intensive investigations. As a result, it has been found that a prepreg in which a modified silicone oil-containing thermosetting resin composition is applied on a fiber substrate presents a phase separation structure, thereby the above problems can be solved, leading to accomplishment of the present invention.

That is, the present invention is concerned with:

(1) A prepreg comprising a fiber substrate and a layer made of a thermosetting resin composition, wherein the layer made of the thermosetting resin composition contains a modified silicone oil or a compound having a skeleton derived from a modified silicone oil, and the layer made of a thermosetting resin composition has a phase separation structure;

(2) The prepreg according to (1), wherein an occupying area ratio of an island portion per unit area on the observation surface of the layer made of a thermosetting resin composition is 10% or more to 45% or less;

(3) The prepreg according to (1) or (2), wherein the modified silicone oil or the compound having a skeleton derived from a modified silicone oil has a dimethyl silicone skeleton in the molecular structure thereof;

(4) The prepreg according to any one of (1) to (3), wherein the modified silicone oil or the compound having a skeleton derived from a modified silicone oil has a reactive group in a molecular structure thereof;

(5) The prepreg according to any one of (1) to (4), wherein a blending amount of the modified silicone oil or the compound having a skeleton derived from a modified silicone oil is 2 parts by mass or more to 80 parts by mass or less based on 100 parts by mass of a total blending amounts of a thermosetting resin constituting the thermosetting resin composition and a curing agent to be optionally added;

(6) The prepreg according to any one of (1) to (5), wherein the fiber substrate is a glass cloth;
(7) The prepreg according to anyone of (1) to (6), wherein the thermosetting resin composition contains an epoxy resin, a cyanate resin, or a bismaleimide resin;
(8) The prepreg according to any one of (1) to (7), wherein the thermosetting resin composition contains an inorganic filler;
(9) The prepreg according to anyone of (1) to (7), wherein the phase separation structure at a magnification of 2,000 times can be confirmed in the surface observation using an electron microscope;
(10) The prepreg according to any one of (1) to (7), having a fine phase separation structure to such an extent that in the surface observation using an electron microscope, the phase separation structure cannot be confirmed at a magnification of 2,000 times, but the phase separation structure can be confirm at a magnification of 10,000 times;
(11) The prepreg according to (9), wherein in the surface observation using an electron microscope at a magnification of 2,000 times, a number of island portions with a phase separation scale of 1.0 pin or more is 5 or more per 20 µm×20 µm;
(12) The prepreg according to (9), wherein in the surface observation using an electron microscope at a magnification of 10,000 times, a number of island portions with a phase separation scale of 20 nm or more is 2 or more per 200 nm×200 nm;
(13) A laminate prepared by lamination and molding using the prepreg according to any one of (1) to (12); and
(14) A printed wiring board manufactured by using the laminate of (13).

Effects of the Invention

According to the present invention, a prepreg having excellent low thermal expansion properties and warpage characteristics can be provided. The prepreg of the invention can be suitably used for laminates and printed wiring boards.

MODES FOR CARRYING OUT THE INVENTION

Figure 1:
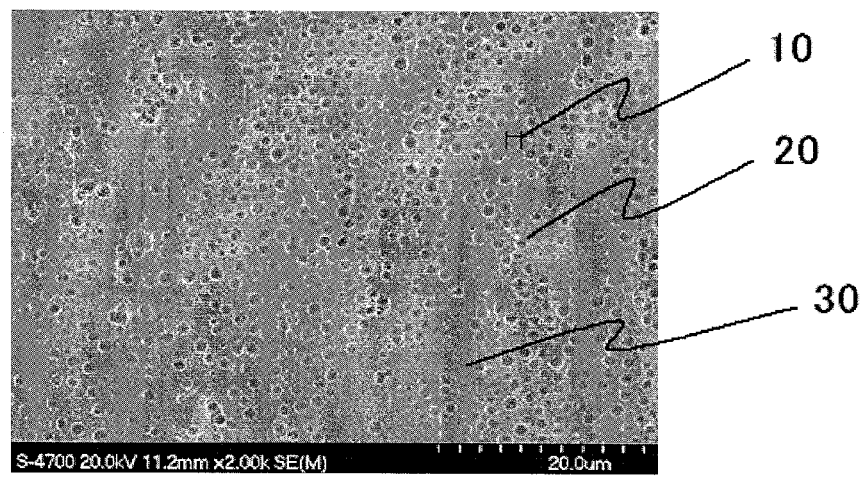
FIG. 1 Observation results of phase separation structure by SEM (2,000 times)
FIG. 2 Observation results of phase separation structure by SEM (10,000 times)

The prepreg of the present invention comprises a fiber substrate and a layer made of a thermosetting resin composition and can be, for example, manufactured by applying a thermosetting resin composition onto a fiber substrate. The prepreg as referred to herein means generally one obtained by applying a thermosetting resin composition onto a fiber substrate and then heat-drying to be semi-cured. Here, as the fiber substrate, inorganic fibers such as E-glass, D-glass, S-glass, Q-glass, or organic fibers such as polyethylene, polyparaphenylene benzobisoxazole, aramid, polyarylate, polyimide, polyester, polytetrafluoroethylene may be used. Also, these fibers may be either a woven fabric or a nonwoven fabric. Among the above fiber substrates, a glass cloth is especially preferred from the viewpoint of lowing the coefficient of thermal expansion.

Also, the thickness of the fiber substrate is not particularly limited, and for example, the fiber substrates with about 0.03 to 0.5 mm thickness may be used. Those having been subjected to a surface treatment with a silane coupling agent, etc., or those having been subjected to a mechanical opening treatment are suitable from the viewpoint of heat resistance, moisture resistance, and processability.

The layer made of a thermosetting resin composition, which is used for the prepreg of the present invention, is characterized by containing a modified silicone oil or a compound having a skeleton derived from a modified silicone oil (hereinafter referred to as "modified silicone oil") and having a phase separation structure. Here, the layer made of a thermosetting resin composition refers to a portion other than the fiber substrate of the prepreg (the layer made of a thermosetting resin composition is made of a semi-cured thermosetting resin composition). It should be noted that the compound having a skeleton derived from a modified silicon oil in the present invention mostly refers to a compound formed by a reaction between a modified silicone oil and a thermosetting resin, as described hereinafter in detail.

The phase separation structure in the present invention means a sea-island structure. Examples of the phase separation structure include shapes such as a spherical structure, a columnar structure, a rod-like structure, a pyramidal structure, a conical structure, an elliptical structure, a lamellar structure, and a co-continuous structure. In the present invention, an island portion and a sea portion of the sea-island structure may partially react with each other by a reactive group.

Although the modified silicon oils may be contained in whichever of the island and sea portions, from the viewpoint of peel strength in the case of forming a laminate or the viewpoint of surface roughness after chemical roughening, it is preferred that the modified silicon oils is contained in the island portion. Also, from the viewpoint of remarkably lowering the coefficient of thermal expansion, it is preferred that the modified silicon oils are contained in the sea portion. It is preferred that the island portion and the sea portion in the present invention differ from each other with respect to an elastic modulus. Then, in the case that the island portion has a low elasticity compared to the sea portion and the sea proton has a high elasticity, it is possible to realize high elasticity as the whole of the substrate. In contrast, in the case that the island portion has a high elasticity compared with the sea portion and the sea portion has a low elasticity, the whole of the substrate becomes low in the coefficient of thermal expansion. It is preferred to change the constitution depending upon the respective purpose.

A method for observing the phase separation structure of the present invention is not particularly limited so far as the phase separation structure can be observed. Examples thereof include a method for observing the surface by a microscope, a method for observing the substrate cross section by a microscope, a method for observing an ultra-thin section being dyed with iodine by a transmission electron microscope, a method for observing using a scanning electron microscope (hereinafter abbreviated as "SEM"), and a method for observing using X-rays.

Figure 2:
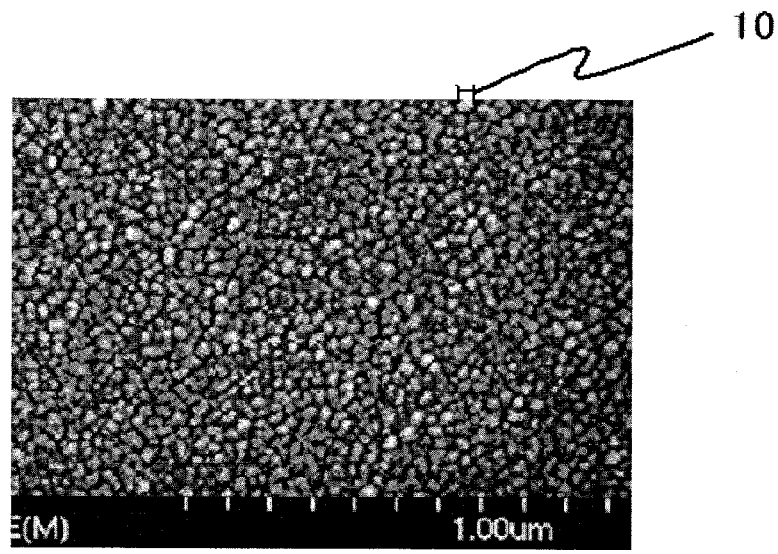

Observation results by SEM are shown in FIG. 1 and FIG. 2. In the present invention, among the above structures, there are many phase separation structures exhibiting a spherical structure, and those phase separation structures are preferred from the viewpoint of achieving the effects of the invention of the present application. It should be noted that in the case where it is difficult to confirm the phase separation structure on the surface at the time of observing the surface, it becomes easy to confirm the phase separation by shaving off the layer of the surface by means of ion milling or the like.

By using a rigid and high-elastic resin in combination with a flexible and low-elastic silicone oil, the present invention found that the prepreg has a phase separation structure having a high-elastic portion and a low-elastic portion, thereby relaxes a stress, contributes to lowering the coefficient of thermal expansion, and makes it possible to suppress a warpage.

With regard to the layer made of the thermosetting resin composition in the present prepreg, it is preferred that an occupied area ratio of the island portion per unit area of the observation surface is 10% or more to 45% or less. When the occupied area ratio of the island portion is 10% or more, it is possible to lower the thermal expansion of the prepreg and the laminate using the same and the wiring board, and also to lower the warpage, due to characteristics of the island portion. The occupied area ratio of the island portion per unit area is more preferably 15% or more, and especially preferably 20%- or more. Although an upper limit thereof is not particularly limited within the range where the phase separation structure is presented, it is usually about 50%. From the viewpoint of stability of the phase separation structure, the occupied area ratio of the island portion per unit area is preferably 45% or less.

In the present invention, it is preferred to use SEM as the method for observing the phase separation structure. The case of using SEM is described in detail below.

Firstly, a result of the surface observation using SEM at a magnification of 2,000 times is shown in FIG. 1. In this way, for confirming the phase separation structure, the observation at a magnification of about 2,000 times is suitable. In the case where the phase separation structure is observed by means of surface observation at a magnification of 2,000 times, it is preferred that a number of island portions with a phase separation scale of 1.0 μm or more is 5 or more per 20 μm×20 μm.

Next, a diagram of the surface observation using SEM at a magnification of 10,000 times is shown in FIG. 2. In the case where the phase separation structure cannot be confirmed at a magnification of 2,000 times, it is preferred to perform the observation at a magnification of 10,000 times. In the case of having a fine phase separation structure to such an extent that the phase separation structure can be confirmed at a magnification of 10,000 times, it is preferred that a number of island portions with a phase separation scale of 20 nm or more is 2 or more per 200 nm×200 nm.

It should be noted that the phase separation scale as referred to herein means a maximum size of the island portion as shown in FIGS. 1 and 2. In general, the island portion frequently shows a spherical shape, and in that case, the phase separation scale means a diameter of the sphere.

In the present invention, a general organic or inorganic filler which is blended in the thermosetting resin composition is not considered as the island portion.

As a measuring method for the above SEM observation (including a pre-treatment condition), the following technique is exemplified. Here, the observation surface as used herein means a front surface, a rear surface, a cross section, or the like, of the observation object, that is the prepreg, the laminate, or the printed wiring board which has been optionally treated so as to be suited for SEM observation.

(a) The thermosetting resin composition is, for example, applied onto a substrate made of a glass plate, a metal plate, or a resin such as polyethylene terephthalate so as to have 35 to 45 μm thickness after drying, and heat-dried to be semi-cured.
(b) The surface of the semi-cured resin is subjected to an ion milling treatment using an argon gas.
(c) The surface observation by a scanning electron microscope is performed.

The substrate is not particularly limited, and general-purpose substrates can be used. Also, a method of applying is not particularly limited, so the application may be performed by using a usual desk coater.

With respect to drying, drying can be performed by using a usual explosion-proof dryer and is not particularly limited.

In the present invention, in the case where it is difficult to confirm the phase separation structure due to the presence of a filler, it is possible to observe by applying and drying the thermosetting resin composition being formulated with the exception of the filler in the manner as described above.

With respect to the ion milling treatment, a treatment which is generally adopted as the pre-treatment of the SEM observation can be performed and is not particularly limited. More specifically, unfocused argon ion beam is irradiated on the semi-cured resin, and the sample surface is polished without applying a stress while utilizing a sputtering phenomenon. According to such a treatment, the phase separation structure is more distinctly observed due to a difference in the etching rate.

The modified silicone oil which is contained in the thermosetting resin composition in the present invention has a linear siloxane skeleton and also has hydrogen or a group other than hydrocarbon group in a molecular structure. As the modified silicone oil, those which are commercially available as a modified silicone oil can be used. Among them, those having a dimethyl silicone skeleton in a molecular structure are preferred. Also, those having a reactive group in a molecular structure are preferred, and those having a dimethyl silicone skeleton in a molecular structure and also having a reactive group capable of reacting with the thermosetting resin in a molecular structure are especially preferred.

The reactive group may be introduced into a part of a side chain of polysiloxane, may be introduced into one end or both ends of polysiloxane, or may be introduced into a side chain of polysiloxane and also into one end or both ends thereof.

Examples of the reactive group include an epoxy group, an amino group, a hydroxyl group, a methacryl group, a mercapto group, a carboxyl group, an alkoxy group, and a silanol group.

As the silicone oil having an epoxy group in a molecular structure thereof, commercially available products can be used. Examples of silicone oil include those having epoxy-modified groups on both ends, such as "X-22-163" (functional group equivalent: 200), "KF-105" (functional group equivalent: 490), "X-22-163A" (functional group equivalent: 1,000), "X-22-163B" (functional group equivalent: 1,750), and "X-22-163C" (functional group equivalent: 2,700); those having alicyclic epoxy group on both ends, such as "X-22-169AS" (functional group equivalent: 500) and "X-22-169B" (functional group equivalent: 1,700); those having epoxy modified group on one-end, such as "X-22-173DX" (functional group equivalent: 4,500); those having epoxy modified groups in the side-chain and on both ends, such as "X-22-9002" (functional group equivalent: 5,000); those having epoxy modified groups in the side-chain, such as "X-22-343" (functional group equivalent: 525), "KF-101" (functional group equivalent: 350), "KF-1001" (functional group equivalent: 3,500), "X-22-2000" (functional group equivalent: 620), "X-22-4741" (functional group equivalent: 2,500), and "KF-1002" (functional group equivalent: 4,300); and those having alicyclic epoxy modified groups in the side-chain, such as "X-22-2046" (functional group equivalent: 600) and "KF-102" (functional group equivalent: 3,600) (all of which are manufactured by Shin-Etsu Chemical Co., Ltd.). These can be used alone or in combination of two or. Furthermore, they can be mixed with various epoxy resins.

As the silicone oil having an amino group in the molecular structure, commercially available products can be used. Examples of silicone oil include those having an amino group on both ends, such as ""KF-8010" (functional group equivalent: 430), "X-22-161A" (functional group equivalent: 800), "X-22-161B" (functional group equivalent: 1,500), "KF-8012" (functional group equivalent: 2,200), "KF-8008" (functional group equivalent: 5,700), "X-22-9409" (functional group equivalent: 700), and "X-22-1660B-3" (functional group equivalent: 2,200) (all of which are manufactured by Shin-Etsu Chemical Co., Ltd.), and "BY-16-853U" (functional group equivalent: 460), "BY-16-853" (functional group equivalent: 650), and "BY-16-853B" (functional group equivalent: 2,200) (all of which are manufactured by Dow Corning Toray Co., Ltd.); and those having an amino group in the side chain, such as "KF-868" (functional group equivalent: 8,800), "KF-865" (functional group equivalent: 5,000), "KF-864" (functional group equivalent: 3,800), "KF-880" (functional group equivalent: 1,800), and "KF-8004" (functional group equivalent: 1,500) (all of which are manufactured by Shin-Etsu Chemical Co., Ltd.). These may be used alone or in combination of two or more.

As the silicone oil having a hydroxyl group in the molecular structure, commercially available products can be used. Examples of silicone oil include those having a hydroxyl group on both ends, such as "KF-6001" (functional group equivalent: 900) and "KF-6002" (functional group equivalent: 1,600); those having a phenolic hydroxyl group on both ends, such as "X-22-1821" (functional group equivalent: 1,470) (all of which are manufactured by Shin-Etsu Chemical Co., Ltd.) and "BY-16-752A" (functional group equivalent: 1,500) (which is manufactured by Dow Corning Toray Co., Ltd.); those having a hydroxyl group on one end, such as "X-22-170BX" (functional group equivalent: 2,800), "X-22-170DX" (functional group equivalent: 4,670); "X-22-176DX" (functional group equivalent: 1,600), and "X-22-176F" (functional group equivalent: 6,300) (all of which are manufactured by Shin-Etsu Chemical Co., Ltd.); those having a hydroxyl group in the side chain, such as "X-22-4039" (functional group equivalent: 970) and "X-22-4015" (functional group equivalent: 1,870) (all of which are manufactured by Shin-Etsu Chemical Co., Ltd.); those having a hydroxyl group on both polyether ends, such as "SF8427" (functional group equivalent: 930, manufactured by Dow Corning Toray Co., Ltd.) and "X-22-4952" (functional group equivalent: 1,100, manufactured by Shin-Etsu Chemical Co., Ltd.); and those having a hydroxyl group in the polyether side chain, such as "FZ-2162" (functional group equivalent: 750) and "SH3773M" (functional group equivalent: 800) (all of which are manufactured by Dow Corning Toray Co., Ltd.). These may be used alone or in combination of two or more.

As the silicone oil having a methacryl group in the molecular structure, commercially available products can be used. Examples of silicone oil include those having a methacryl group on both ends, such as "X-22-164A" (functional group equivalent: 860) and "X-22-164B" (functional group equivalent: 1,630); and those having a methacryl group on one end, such as "X-22-174DX" (functional group equivalent: 4,600) (all of which are manufactured by Shin-Etsu Chemical Co., Ltd.). These may be used alone or in combination of two or.

As the silicone oil having a mercapto group in the molecular structure, commercially available products can be used. Examples of silicone oil include those having a mercapto group on both ends, such as "X-22-167B" (functional group equivalent: 1,670); and those having a mercapto group in the side chain, such as "KF-2001" (functional group equivalent: 1,900) and "KF-2004" (functional group equivalent: 30,000) (all of which are manufactured by Shin-Etsu Chemical Co., Ltd.). These may be used alone or in combination of two or more.

As the silicone oil having a carboxyl group in the molecular structure, commercially available products can be used. Examples thereof include those having a carboxyl group on both ends, "X-22-162C" (functional group equivalent: 2,300); those having a carboxyl group on one end, "X-22-3710" (functional group equivalent: 1,450); and those having a carboxyl group in the side chain, "X-22-3701E" (functional group equivalent: 4,000) (all of which are manufactured by Shin-Etsu Chemical Co., Ltd.). These may be used alone or in combination of two or more.

As the silicone oil having an alkoxy group in the molecular structure, commercially available products can be used. Examples thereof include those having an alkoxy group in the side chain, such as "FZ-3704" (functional group equivalent: 150) (which is manufactured by Dow Corning Toray Co., Ltd.). These may be used alone or in combination of two or more.

As the silicone oil having a silanol group in the molecular structure, commercially available products can be used. Examples thereof include those having a silanol group on both ends, such as "X-21-5841" (functional group equivalent: 500, manufactured by Shin-Etsu Chemical Co., Ltd.) and "Z-6018" (functional group content: 6% by weight, manufactured by Dow Corning Toray Co., Ltd.). These may be used alone or in combination of two or more.

Among them, silicone oils modified with an epoxy group, an amino group, or a hydroxyl group are especially preferred. Above all, both ends-modified silicones are preferred from the viewpoint of reactivity, and those having a functional group equivalent of 5,000 or less are more preferred from the viewpoint of compatibility.

A content of the modified silicone oil in the thermosetting resin composition in the present invention is preferably 2 parts by mass or more to 80 parts by mass or less based on 100 parts by mass of the total blending amounts of a thermosetting resin and a curing agent as described in detail below, which is optionally added. What the blending amount of the silicone oil is 2 parts by mass or more is preferred because the phase separation structure is easily produced. From the above viewpoint, the blending amount of the silicone oil is more preferably 5 parts by mass or more, especially preferably 7 parts by mass or more, and still more preferably 10 parts by mass or more. On the other hand, although an upper limit value of the blending amount of the silicone oil is not particularly limited within the range where the effects of the present invention are obtained. From the viewpoint of moldability and adhesion of the prepreg, it is preferably 80 parts by mass or less, and more preferably 50 parts by mass or less.

Although the thermosetting resin constituting the thermosetting resin composition in the present invention is not particularly limited, examples thereof include an epoxy resin, a phenol resin, an unsaturated imide resin such as a bismaleimide resin, a cyanate resin, an isocyanate resin, a benzoxazine resin, an oxetane resin, an amino resin, an unsaturated polyester resin, an allyl resin, a dicyclopentadiene resin, a silicone resin, a triazine resin, and a melamine resin. These may be used alone or in combination of two or more. Among them, from the viewpoint of moldability and electrical insulating properties, an epoxy resin, a cyanate resin, and an unsaturated imide resin are preferred.

Examples of the epoxy resin include a bisphenol A type epoxy resin, a bisphenol F type epoxy resin, a bisphenol S type epoxy resin, a phenol novolak type epoxy resin, a cresol novolak type epoxy resin, a bisphenol A novolak type epoxy resin, a bisphenol F novolak type epoxy resin, a stilbene type epoxy resin, a triazine skeleton-containing epoxy resin, a fluorene skeleton-containing epoxy resin, a triphenol phenol methane type epoxy resin, a biphenyl type epoxy resin, a xylylene type epoxy resin, a biphenyl aralkyl type epoxy resin, a naphthalene type epoxy resin, a dicyclopentadiene type epoxy resin, an alicyclic epoxy resin, polyfunctional phenols, and a diglycidyl ether compound of a polycyclic aromatic compound such as anthracene, and a phosphorus-containing epoxy resin obtained by introducing a phosphorus compound therein. These may be used alone or in combination of two or more. Among them, from the viewpoint of heat resistance and flame resistance, a biphenyl aralkyl type epoxy resin and a naphthalene type epoxy resin are preferred.

As the cyanate resin, for example, there can be exemplified a novolak type cyanate resin, a bisphenol type cyanate resin such as a bisphenol A type cyanate resin, a bisphenol E type cyanate resin, and a tetramethyl bisphenol F type cyanate resin, and a prepolymer thereof which is partially converted into triazine. These may be used alone or in combination of two or more. Among them, from the viewpoint of heat resistance and flame resistance, a novolak type cyanate resin is preferred.

As the unsaturated imide resin, for example, there can be exemplified maleimide compounds such as bis(4-maleimidophenyl)methane, 3,3'-dimethyl-5,5'-diethyl-4,4'-diphenylmethane bismaleimide, 2,2'-bis[4-(4-maleimidophenoxy)phenyl]propane, and polyphenylmethane maleimide. These may be used alone or in combination of two or more. Among them, from the viewpoint of heat resistance, a bismaleimide resin such as bis(4-maleimidophenyl)methane is preferred.

In the present invention, in the case of containing the modified silicone oil in an island portion, the following three cases may be probably considered as a component constituting the island portion.

(1) The case where the island portion is substantially occupied by the modified silicone oil.
(2) The case where the island portion is occupied by the modified silicone oil and a compound formed by a reaction of the modified silicone oil with the thermosetting resin.
(3) The case where the island portion is substantially occupied by a compound formed by a reaction of the modified silicone oil with the thermosetting resin.

The compound having a skeleton derived from a modified silicone oil in the present invention mostly means the compound formed by a reaction of the modified silicone oil with the thermosetting resin in the above (2) and (3). Although such a compound is usually formed at the time of manufacturing of a prepreg, it can also be formed in advance, not only at the time of manufacturing of a prepreg.

As a method for forming such a compound in advance, it is preferred to allow the thermosetting resin and the silicone oil to react with each other in an organic solvent prior to blending, thereby preparing the compound as a prepolymer.

Although the organic solvent which is used for this reaction is not particularly limited, examples thereof include an alcohol based solvent such as ethanol, propanol, butanol, methyl cellosolve, butyl cellosolve, and propylene glycol monomethyl ether; a ketone based solvent such as acetone, methyl ethyl ketone, and methyl isobutyl ketone, cyclohexanone; an ester based solvent such as ethyl acetate and γ-butyrolactone; an ether based solvent such as tetrahydrofuran; an aromatic solvent such as toluene, xylene, and mesitylene; a nitrogen atom-containing solvent such as dimethylformamide, dimethylacetamide, and N-methylpyrrolidone; and a sulfur atom-containing solvent such as dimethyl sulfoxide. These can be used alone or in combination of two or more. Among these organic solvents, from the viewpoint of solubility, cyclohexanone, propylene glycol monomethyl ether, methyl isobutyl ketone, toluene, and dimethylacetamide are preferred. Propylene glycol monomethyl ether, toluene, and dimethylacetamide are especially preferred in view of the fact that they have high volatility and hardly remain as a residual solvent.

In addition, a reaction catalyst can be optionally used for this reaction and is not particularly limited so far as it is generally used as a reaction catalyst. Examples of the reaction catalyst include an organic metal salt and an organic metal complex such as zinc naphthenate, cobalt naphthenate, tin octylate, cobalt octylate, cobalt(II)bisacetylacetonate, and cobalt (III) triacetylacetonate, imidazoles and a derivative thereof, an organic phosphorus based compound, a secondary amine, a tertiary amine, and a quaternary ammonium. These can be used alone or in combination of two or more.

In the thermosetting resin composition in the present invention, a curing agent and a curing accelerator can be used as necessary. Although not particularly limited, examples of the thermosetting resin include a polyfunctional phenol compound such as phenol novolak, cresol novolak, and an aminotriazine novolak resin; an amine compound such as dicyandiamide, diaminodiphenylmethane, and diaminodiphenylsulfone; and an acid anhydride such as phthalic anhydride, pyromellitic anhydride, maleic anhydride, and a maleic anhydride copolymer. These can be used alone or in combination of two or more. Among them, from the viewpoint of heat resistance and storage stability, a polyfunctional phenol compound and an amine compound are preferred.

Examples of the polyfunctional phenol compound include novolak resins using a various phenol such as phenols, cresols, ethylphenols, butylphenols, octylphenols, bisphenol A, bisphenol F, bisphenol S, and naphthols as a raw material, and various novolak resins such as a xylylene skeleton-containing phenol novolak resin, a dicyclopentadiene skeleton-containing phenol novolak resin, a biphenyl skeleton-containing phenol novolak resin, and a fluorene skeleton-containing phenol novolak resin.

Examples of the amine compound include an amine compound having an acidic substituent in the molecular structure, such as p-aminophenol, p-aminobenzoic acid, p-aminobenzenesulfonic acid, and 3,5-dihydroxyaniline, 3,5-dicarboxyaniline; aromatic amines such as p-phenylenediamine, 4,4'-diaminodiphenylmethane, 3,3'-dimethyl-4,4'-diaminodiphenylmethane, 3,3'-diethyl-4,4'-diaminodiphenylmethane, 2,2'-bis[4-(4-aminophenoxy)phenyl] propane, and 4,4'-diaminodiphenylsulfone; and guanamine compounds. These can be used alone or in combination of two or more. From the viewpoint of reactivity and solubility, p-aminophenol, 3,3'-diethyl-4,4-diaminodiphenylmethane, and 2,2'-bis [4-(4-aminophenoxy)phenyl]propane are preferred.

It is preferred to allow such an amine compound to react with the above unsaturated imide resin in an organic solvent prior to blending as needed, thereby preparing the compound as a prepolymer. The organic solvent and a reaction catalyst which are used for this reaction are the same as the organic solvent and the reaction catalyst used for the preparation of a prepolymer of the silicone oil and the thermosetting resin as described above.

Examples of the curing accelerator include an organic metal salt and an organic metal complex such as zinc naphthenate, cobalt naphthenate, tin octylate, cobalt octylate, cobalt (II) bisacetylacetonate, cobalt (III) trisacetylacetonate, zinc(II) acetylacetonate, and iron(III) acetylacetonate, imidazoles and a derivative thereof, an organic phosphorus based compound, secondary amines, tertiary amines, and a quaternary ammonium salt. These can be used alone or in combination of two or more.

From the viewpoint of curing properties and solvent solubility, as the organic metal salt and the organic metal complex, cobalt (II) bisacetylacetonate, cobalt(III) trisacetylacetonate, zinc(II) acetylacetonate, zinc naphthenate, and iron (III) acetylacetonate are preferred, and cobalt (II) bisacetylacetonate and zinc naphthenate are especially preferred.

As the imidazoles and derivative thereof, an isocyanate resin represented by the following general formula (I) and a compound represented by the following general formula (II) are preferred. This is because that they are able to be cured and molded at a relatively low temperature as not higher than 200° C. due to catalytic activity, and furthermore, they are excellent in the stability with time of a varnish or a prepreg. Also, a compound represented by the following formula (III) or (IV) is preferred because it is able to be used in a small blending amount and is commercially inexpensive.

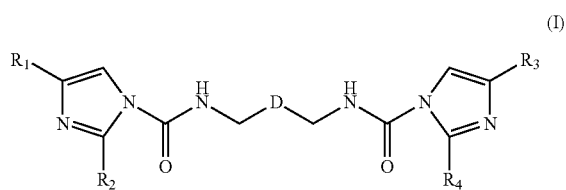

(I)

In the formula, each of $R_1$, $R_2$, $R_3$, and $R_4$ each independently represents a hydrogen atom, an aliphatic hydrocarbon group having a carbon number of 1 to 5, or a phenyl group; and D represents any one of a single bond, an alkylene group, an alkylidene group, an ether group, and a sulfonyl group.

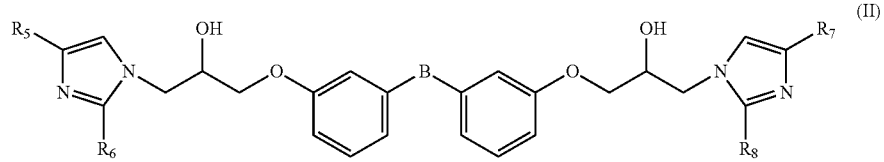

(II)

In the formula, $R_5$ to $R_8$ are the same as $R_1$ to $R_4$; and B represents a residual group of an isocyanate resin, such as an alkylene group and an aromatic hydrocarbon group.

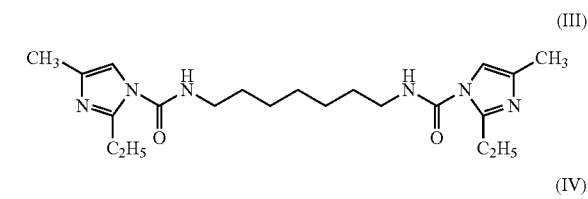

(III)

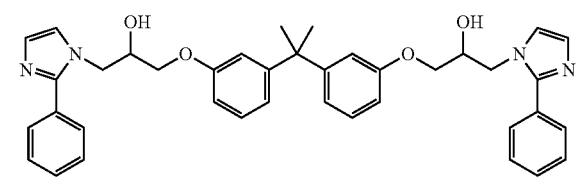

(IV)

A used amount of the curing accelerator is preferably 0.1 to 10 parts by mass, more preferably 0.1 to 5 parts by mass, and especially preferably 0.1 to 1 part by mass based on 100 parts by mass of a total amount of resins in terms of solid content. When the used amount of the curing accelerator is 0.1 parts by mass or more, sufficient heat resistance, flame resistance and copper foil adhesion and the like are obtainable. Whereas when it is 10 parts by mass or less, sufficient heat resistance, stability with time and press moldability are obtainable.

In the thermosetting resin composition in the present invention, an inorganic filler can be optionally used in combination. Examples of the inorganic filler include silica, alumina, talc, mica, kaolin, aluminum hydroxide, boehmite, magnesium hydroxide, zinc borate, zinc stannate, zinc oxide, titanium oxide, boron nitride, calcium carbonate, barium sulfate, aluminum borate, potassium titanate, a glass powder of E-glass, T-glass, D-glass and so on, and a hollow glass beads. These can be used alone or in combination of two or more.

Among them, from the viewpoint of dielectric characteristics, heat resistance, and low thermal expansion properties, silica is especially preferred. Examples of the silica include precipitated silica which is manufactured by a wet process and has a high water content; and dry silica which is manufactured by a dry process and does not substantially contain bonding water and so on. Furthermore, the dry silica includes crushed silica, fumed silica, and spherical fused silica depending upon a difference of the manufacturing method. Among them, from the viewpoint of low thermal expansion properties and high fluidity on being filled in the resin, spherical fused silica is preferred.

In the case of using spherical fused silica as the inorganic filler, its average particle size is preferably 0.1 to 10 µm, and more preferably 0.3 to 8 µm. When the average particle size of the spherical fused silica is controlled to 0.1 µm or more, the fluidity on being highly-filled in the resin can be kept favorable. Whereas when it is controlled to 10 µm or less, an incorporation probability of coarse particles is reduced so as to suppress the generation of failure to be caused due to the coarse particles. Here, the average particle size as referred to herein means a particle size corresponding to just 50% of the volume when a cumulative distribution curve by particle size is determined while defining the whole volume of the particles as 100%, and it can be measured by a laser diffraction-scattering type particle size distribution analyzer and so on.

A content of the inorganic filler is preferably 20 to 300 parts by mass, and more preferably 50 to 200 parts by mass based on 100 parts by mass of the total amount of resin in terms of solid content. When the content of the inorganic filler is controlled to 20 to 300 parts by mass based on 100 parts by mass of the total resin components, the moldability and low thermal expansion properties of the prepreg can be kept favorable.

In the thermosetting resin composition in the present invention, any known thermoplastic resin, elastomer, flame retarder and organic filler and so on can be optionally used in combination.

Examples of the thermoplastic resin include polytetrafluoroethylene, polyethylene, polypropylene, polystyrene, a polyphenylene ether resin, a phenoxy resin, a polycarbonate resin, a polyester resin, a polyamide resin, a polyimide resin, a xylene resin, a petroleum resin, and a silicone resin.

Examples of the elastomer include polybutadiene, polyacrylonitrile, epoxy-modified polybutadiene, maleic anhydride-modified polybutadiene, phenol-modified polybutadiene, and carboxy-modified polyacrylonitrile.

Examples of the organic filler include a silicone powder and an organic material powder of tetrafluoroethylene, polyethylene, polypropylene, polystyrene and polyphenylene.

In the thermosetting resin composition in the present invention, an ultraviolet light absorber, an antioxidant, a photopolymerization initiator, a fluorescent brightener, and an adhesion improver and the like can also be added, and there are no particular limitations. Examples thereof include an ultraviolet light absorber such as a benzotriazole based material; an antioxidant such as a hindered phenol based material, and styrenated phenol; a photopolymerization initiator such as benzophenones, benzyl ketals, thioxanthones; a fluorescent brightener such as stilbene derivatives; a urea compound such as silane urea; and an adhesion improver such as a silane coupling agent.

The prepreg of the present invention is one having the above thermosetting resin composition applied onto a substrate. In this point, it is preferred to apply the thermosetting resin composition onto the substrate as a varnish in which the respective components thereof are dissolved or dispersed in an organic solvent.

Examples of the organic solvent usable include an alcohol based solvent such as methanol, ethanol, propanol, butanol, methyl cellosolve, butyl cellosolve, and propylene glycol monomethyl ether; a ketone based solvent such as acetone, methyl ethyl ketone, methyl isobutyl ketone, and cyclohexanone; an ester based solvent such as butyl acetate and propylene glycol monomethyl ether acetate; an ether based solvent such as tetrahydrofuran; an aromatic solvent such as toluene, xylene, and mesitylene; a nitrogen atom-containing solvent such as dimethylformamide, dimethylacetamide, and N-methylpyrrolidone; and a sulfur atom-containing solvent such as dimethyl sulfoxide. These can be used alone or in combination of two or more. Among them, from the viewpoint of low toxicity and solubility, methyl ethyl ketone, methyl isobutyl ketone, cyclohexanone, and propylene glycol monomethyl ether are preferred. Methyl ethyl ketone and propylene glycol monomethyl ether are more preferred in view of the fact that these have high volatility and hardly remain as a residual solvent at the time of manufacturing of a prepreg.

The prepreg of the present invention can be manufactured by applying the above varnish onto the substrate, followed by semi-curing (B-staging) by heating for example.

More specifically, the prepreg of the present invention can be obtained by applying the varnish onto the substrate in such a manner that the applying amount of the resin composition relative to the substrate is 20 to 90% by mass in terms of a resin content of the prepreg after drying, and then heat-drying usually at a temperature of 100 to 200° C. for 1 to 30 minutes to be semi-cured (B-staging). As stated above, it is possible to obtain the prepreg of the invention.

The laminate of the present invention can be constructed by lamination and molding using the above prepreg of the present invention. The laminate can be, for example, manufactured by lamination and molding such that 1 to 20 sheets of the prepreg of the present invention are superimposed, and a metal foil such as copper and aluminum is disposed on one surface or both surfaces thereof. The metal foil is not particularly limited so far as it is used for an application of electrical insulating materials. As for a molding condition, for example, methods for a laminate and a multilayered board for electrical insulating material can be applied. More specifically, the molding can be performed within the temperature range of 100 to 250° C. under a pressure of 2 to 100 kgf/cm$^2$ for a heating time of from 0.1 to 5 hours by using a multiplaten press, a multiplaten vacuum press, a continuous molding machine, or an autoclave molding machine.

The printed wiring board of the present invention is manufactured by forming a circuit on the surface of the laminate. That is, a conductor layer of the laminate according to the present invention is subjected to wiring processing by a usual etching method, and a plurality of the laminates having been subjected to wiring processing are laminated via the above prepreg and then subjected to heat press processing, thereby achieving multilayering in block. Thereafter, a multilayered printed wiring board can be manufactured through the formation of a through-hole or a blind via hole by means of drill processing or laser processing and the formation of an interlayer connection by plating or with an electrically conductive paste.

EXAMPLES

The present invention is described in more detail with reference to the following Examples, but should not be restricted at all.

It should be noted that laminates obtained in the respective Examples and Comparative Examples were used and measured and evaluated with respect to glass transition temperature, coefficient of thermal expansion, solder dip resistance of the copper clad laminate, and warpage characteristics in the following methods.

(1) Measurement of Glass Transition Temperature (Tg):

A substrate for evaluation of 5 mm square was fabricated by dipping a copper clad laminate in a copper etching liquid to remove a copper foil and subjected to thermal mechanical analysis by a compression method using a TMA test apparatus (TMA2940, manufactured by Du Pont). The substrate for evaluation was installed in the apparatus in the Z-direction and then continuously measured twice under a measurement condition at a load of 5 g and at a heating rate of 10° C./min. Tg expressed by a point of intersection of different tangents of a thermal expansion curve in the second measurement was determined and evaluated for heat resistance.

(2) Measurement of Coefficient of Thermal Expansion:

A substrate for evaluation of 5 mm square was fabricated by dipping a copper clad laminate in a copper etching liquid to remove a copper foil and subjected to thermal mechanical analysis by a compression method using a TMA test apparatus (TMA2940, manufactured by Du Pont). The substrate for evaluation was installed in the apparatus in the X-direction and then continuously measured twice under a measurement condition at a load of 5 g and at a heating rate of 10° C./min. An average coefficient of thermal expansion at 30° C. to 100° C. in the second measurement was calculated, and this was defined as a value of the coefficient of thermal expansion. This is because for the purpose of improving the accuracy, the results of the second measurement are used.

(3) Evaluation of Solder Dip Resistance of the Copper Clad Laminate:

A substrate for evaluation of 25 mm square was fabricated from a copper clad laminate plate, and the substrate for evaluation was floated in a soldering bath at a temperature of 288°

C. for 120 minutes and observed for an appearance thereof, thereby evaluating the copper clad laminate heat resistance.

(4) Evaluation of Warpage Amount:

A warpage amount of a substrate was evaluated by means of shadow moire analysis using TherMoire PS200, manufactured by AKROMETRIX. A sample size of the substrate was set to 40 mm×40 mm, and a measuring area was set to 36 mm×36 mm. The sample was heated from room temperature to 260° C. and then cooled to 50° C., thereby measuring the warpage amount.

(5) Observation by SEM:

i. Preparing Method of Semi-Cured Resin:

A thermosetting resin composition was applied onto polyethylene terephthalate (PET) so as to obtain 35 to 45 μm resin thickness after drying by using a desk coater. After applying, heat-drying was performed at 180° C. for one hour by using an explosion-proof dryer, thereby obtaining a semi-cured resin.

ii. Ion Milling Treatment:

The surface of the semi-cured resin was subjected to an ion milling treatment with an Ar gas.

iii. SEM Observation:

As for the surface shape of the semi-cured resin having been subjected to an ion milling treatment, since the morphology can be observed from a difference of the etching rate, the surface observation using SEM was performed (see FIGS. 1 and 2).

Examples 1 to 18 and Comparative Examples 1 to 6

A modified silicone oil, a thermosetting resin, a curing agent, an inorganic filler, and a curing accelerator as shown below were mixed in a blending proportion (parts by mass) shown in Table 1 by using methyl ethyl ketone as a dilution solvent, thereby obtaining a uniform varnish having a resin content of 65% by mass.

Subsequently, the above varnish was applied onto an E-glass cloth and a T-glass cloth each having a thickness of 0.05 mm, and heat-dried at 160° C. for 10 minutes, thereby obtaining a prepreg having a resin content of 54% by mass.

Two sheets of this prepreg were superimposed, and a 12 μm-thick electrolytic copper foil was disposed on the top and bottom, followed by pressing under a pressure of 2.5 MPa at a temperature of 240° C. for 60 minutes, thereby obtaining a copper clad laminate.

The measurement and evaluation results of the obtained copper clad laminate are shown in Table 2.

(Modified Silicone Oil)

X-22-163A: Dual-end type epoxy-modified silicone [a trade name, manufactured by Shin-Etsu Chemical Co., Ltd.]

X-22-161A: Dual-end type amine-modified silicone [a trade name, manufactured by Shin-Etsu Chemical Co., Ltd.]

X-22-1821: Dual-end type phenol-modified silicone [a trade name, manufactured by Shin-Etsu Chemical Co., Ltd.]

KF-6003: Dual-end type carbinol-modified silicone [a trade name, manufactured by Shin-Etsu Chemical Co., Ltd.]

FZ-2162: Side-chain type polyether-modified silicone [a trade name, manufactured by Dow Corning Toray Co., Ltd.]

X-22-164C: Dual-end type methacryl-modified silicone [a trade name, manufactured by Shin-Etsu Chemical Co., Ltd.]

X-22-167B: Dual-end type mercapto-modified silicon [a trade name, manufactured by Shin-Etsu Chemical Co., Ltd.]

X-22-162C: Dual-end type carboxyl-modified silicone [a trade name, manufactured by Shin-Etsu Chemical Co., Ltd.]

FZ-3704: Side-chain type alkoxy-modified silicone [a trade name, manufactured by Dow Corning Toray Co., Ltd.]

KF-9701: Dual-end type silanol-modified silicone [a trade name, manufactured by Shin-Etsu Chemical Co., Ltd.]

(Thermosetting Resin)

PT-30: Novolak type cyanate resin [a trade name, manufactured by Lonza Japan Ltd.]

NC-7000L: α-Naphthol type epoxy resin [a trade name, manufactured by Nippon Kayaku Co., Ltd.]

BMI: Bis(4-maleimidophenyl)methane [a trade name, manufactured by K.I Chemical Industry Co., Ltd.]

(Curing Agent)

KA-1165: Cresol novolak resin [a trade name, manufactured by DIC Corporation]

KAYAHARD A-A: 3,3'-Diethyl-4,4'-diaminodiphenylmethane [a trade name, manufactured by Nippon Kayaku Co., Ltd.]

p-Aminophenol [manufactured by Kanto Chemical Co., Inc.]

(Inorganic Filler)

SC2050-KNK: Fused silica [a trade name, manufactured by Admatechs Company Limited)

BMT-3LV: Boehmite [a trade name, manufactured by Kawai Lime Industry Co., Ltd.]

(Curing Accelerator)

Zinc(II) naphthenate: Zinc naphthenate, 8% mineral spirit solution [manufactured by Tokyo Chemical Industry Co., Ltd.]

G-8009L: Isocyanate mask imidazole [a trade name, manufactured by Dai-ichi Kogyo Seiyaku Co., Ltd.]

TABLE 1

| Thermosetting resin composition | Example | | | | | |
|---|---|---|---|---|---|---|
| | 1 | 2 | 3 | 4 | 5 | 6 |
| (Modified silicone oil) | | | | | | |
| X-22-163A | 40 | | | | | |
| X-22-161A | | 40 | 40 | 40 | | |
| X-22-1821 | | | | | 30 | 30 |
| (Thermosetting resin) | | | | | | |
| PT-30 | 60 | | | | 60 | |
| NC-7000L | | 60 | | 50 | | 30 |
| BMI | | | 60 | | | 30 |
| (Curing agent) | | | | | | |
| KA-1165 | | | | 10 | | |
| KAYAHARD A-A | | | | | | 10 |
| p-Aminophenol | | | | | 10 | |
| (Inorganic filler) | | | | | | |
| SC2050-KNK | | | | 150 | 150 | 200 |
| BMT-3LV | | | | 50 | 50 | |
| (Curing accelerator) | | | | | | |
| Zinc(II) naphthenate | 0.2 | | | | 0.2 | |
| G-8009L | | 0.2 | 0.7 | 0.2 | | 0.3 |

| Thermosetting resin composition | Example | | | | | |
|---|---|---|---|---|---|---|
| | 7 | 8 | 9 | 10 | 11 | 12 |
| (Modified silicone oil) | | | | | | |
| KF-6003 | 30 | | | | | |
| FZ-2162 | | 40 | | | | |
| X-22-164C | | | 30 | | | |
| X-22-167B | | | | 40 | | |
| X-22-162C | | | | | 40 | |
| FZ-3704 | | | | | | 40 |

TABLE 1-continued

| (Thermosetting resin) | | | | | | |
|---|---|---|---|---|---|---|
| PT-30 | 60 | | | 60 | | 50 |
| NC-7000L | | 40 | 20 | | 50 | |
| BMI | | | 40 | | | |
| (Curing agent) | | | | | | |
| KA-1165 | | | 20 | | | 10 |
| KAYAHARD A-A | | | | 10 | | |
| p-Aminophenol | 10 | | | | | 10 |
| (Inorganic filler) | | | | | | |
| SC2050-KNK | 200 | 200 | 200 | 200 | 200 | 200 |
| (Curing accelerator) | | | | | | |
| Zinc(II) naphthenate | 0.2 | | | 0.2 | | 0.2 |
| G-8009L | | 0.2 | 0.3 | | 0.2 | |

| Thermosetting resin | Example | | | | | |
|---|---|---|---|---|---|---|
| composition | 13 | 14 | 15 | 16 | 17 | 18 |
| (Modified silicone oil) | | | | | | |
| X-22-163A | | 30 | | | | |
| X-22-161A | | | 20 | 20 | | |
| X-22-1821 | | | | | 30 | |
| KF-6003 | | | | | | 30 |
| KF-9701 | 40 | | | | | |
| (Thermosetting resin) | | | | | | |
| PT-30 | 20 | | | | 60 | 60 |
| NC-7000L | 20 | | 30 | 20 | 10 | 10 |
| BMI | | 40 | 40 | 40 | | |

TABLE 1-continued

| (Curing agent) | | | | | | |
|---|---|---|---|---|---|---|
| KA-1165 | 10 | 30 | | | 10 | |
| KAYAHARD A-A | | | | 5 | 5 | |
| p-Aminophenol | 10 | | 5 | 5 | | |
| (Inorganic filler) | | | | | | |
| SC2050-KNK | 200 | 250 | 250 | 250 | 250 | 250 |
| (Curing accelerator) | | | | | | |
| Zinc(II) naphthenate | 0.1 | | | | 0.2 | 0.2 |
| G-8009L | 0.1 | 0.3 | 0.3 | 0.3 | | |

| Thermosetting resin | Comparative Example | | | | | |
|---|---|---|---|---|---|---|
| composition | 1 | 2 | 3 | 4 | 5 | 6 |
| (Thermosetting resin) | | | | | | |
| PT-30 | 50 | | | | 50 | |
| NC-7000L | | 50 | 40 | | | 30 |
| BMI | 50 | | 40 | 80 | 40 | 40 |
| (Curing agent) | | | | | | |
| KA-1165 | | 50 | | | | 10 |
| KAYAHARD A-A | | | 10 | 10 | | 10 |
| p-Aminophenol | | | 10 | 10 | 10 | 10 |
| (Inorganic filler) | | | | | | |
| SC2050-KNK | | 200 | 200 | 200 | 250 | 300 |
| (Curing accelerator) | | | | | | |
| Zinc(II) naphthenate | 0.2 | | | | 0.2 | |
| G-8009L | | 0.2 | 0.2 | 0.3 | | 0.3 |

TABLE 2

| Test item | Example | | | | | |
|---|---|---|---|---|---|---|
| | 1 | 2 | 3 | 4 | 5 | 6 |
| (1) Heat resistance (Tg) | | | | | | |
| E-Glass | 200 | 180 | 220 | 180 | 200 | 210 |
| S-Glass | 200 | 180 | 220 | 180 | 200 | 210 |
| (2) Coefficient of thermal expansion (ppm/° C.) | | | | | | |
| E-Glass | 7.0 | 6.7 | 7.2 | 6.8 | 6.9 | 7.1 |
| S-Glass | 3.8 | 3.5 | 4.0 | 3.6 | 3.7 | 3.8 |
| (3) Copper-stuck solder heat resistance | | | | | | |
| E-Glass | No swollenness | No swollenness | No swollenness | No swollenness | No swollenness | No swollenness |
| S-Glass | No swollenness | No swollenness | No swollenness | No swollenness | No swollenness | No swollenness |
| (4) Warp amount (μm) | | | | | | |
| E-Glass | 47 | 45 | 48 | 45 | 46 | 48 |
| S-Glass | 34 | 32 | 35 | 32 | 33 | 34 |

| Test item | Example | | | | | |
|---|---|---|---|---|---|---|
| | 7 | 8 | 9 | 10 | 11 | 12 |
| (1) Heat resistance (Tg) | | | | | | |
| E-Glass | 200 | 170 | 210 | 200 | 180 | 190 |
| S-Glass | 200 | 170 | 210 | 200 | 180 | 190 |

TABLE 2-continued

|  |  |  |  |  |  |  |
|---|---|---|---|---|---|---|
| (2) Coefficient of thermal expansion (ppm/° C.) | | | | | | |
| E-Glass | 6.6 | 7.2 | 6.8 | 6.8 | 6.7 | 6.8 |
| S-Glass | 3.4 | 4.0 | 3.6 | 3.6 | 3.5 | 3.6 |
| (3) solder dip resistance of the copper clad laminate | | | | | | |
| E-Glass | No swollenness | No swollenness | No swollenness | No swollenness | No swollenness | No swollenness |
| S-Glass | No swollenness | No swollenness | No swollenness | No swollenness | No swollenness | No swollenness |
| (4) Warp amount (μm) | | | | | | |
| E-Glass | 45 | 48 | 45 | 45 | 45 | 45 |
| S-Glass | 30 | 35 | 32 | 32 | 32 | 32 |

| | Example | | | | | |
|---|---|---|---|---|---|---|
| Test item | 13 | 14 | 15 | 16 | 17 | 18 |
| (1) Heat resistance (Tg) | | | | | | |
| E-Glass | 190 | 210 | 210 | 220 | 200 | 200 |
| S-Glass | 190 | 210 | 210 | 220 | 200 | 200 |
| (2) Coefficient of thermal expansion (ppm/° C.) | | | | | | |
| E-Glass | 6.7 | 6.5 | 6.5 | 6.4 | 6.2 | 6.2 |
| S-Glass | 3.5 | 3.3 | 3.3 | 3.2 | 3.0 | 3.0 |
| (3) Copper-stuck solder heat resistance | | | | | | |
| E-Glass | No swollenness | No swollenness | No swollenness | No swollenness | No swollenness | No swollenness |
| S-Glass | No swollenness | No swollenness | No swollenness | No swollenness | No swollenness | No swollenness |
| (4) Warp amount (μm) | | | | | | |
| E-Glass | 45 | 45 | 45 | 44 | 42 | 42 |
| S-Glass | 32 | 30 | 30 | 29 | 28 | 28 |

| | Comparative Example | | | | | |
|---|---|---|---|---|---|---|
| Test item | 1 | 2 | 3 | 4 | 5 | 6 |
| (1) Heat resistance (Tg) | | | | | | |
| E-Glass | 200 | 180 | 210 | 230 | 210 | 220 |
| S-Glass | 200 | 180 | 210 | 230 | 210 | 220 |
| (2) Coefficient of thermal expansion (ppm/° C.) | | | | | | |
| E-Glass | 17.5 | 15.2 | 13.4 | 12.3 | 11.5 | 10.3 |
| S-Glass | 14.5 | 12.2 | 10.4 | 9.3 | 8.5 | 7.3 |
| (3) Copper-stuck solder heat resistance | | | | | | |
| E-Glass | No swollenness | No swollenness | No swollenness | No swollenness | No swollenness | No swollenness |
| S-Glass | No swollenness | No swollenness | No swollenness | No swollenness | No swollenness | No swollenness |
| (4) Warp amount (μm) | | | | | | |
| E-Glass | 150 | 95 | 95 | 80 | 75 | 60 |
| S-Glass | 100 | 80 | 75 | 70 | 63 | 50 |

As is apparent from Tables 1 and 2, when compared with the Comparative Examples, the Examples of the present invention are excellent in the coefficient of thermal expansion and warpage characteristics.

Industrial Applicability

A laminate manufactured by laminating and molding the prepreg of the present invention and a multi-layered printed wiring board manufactured by using the laminate are excellent in glass transition temperature, coefficient of thermal expansion, solder dip resistance, and warpage characteristics, and they are useful as a printed wiring board for electronic appliances.

[Explanations of Letters or Numerals]

10: Phase separation scale
20: Island structure portion
30: Sea structure portion

The invention claimed is:

1. A prepreg comprising a fiber substrate and a layer made of a thermosetting resin composition, wherein the layer made of the thermosetting resin composition contains a modified silicone oil or a compound having a skeleton derived from a modified silicone oil, and the layer made of a thermosetting resin composition has a phase separation structure, said phase separation structure being a sea-island structure, wherein an occupying area ratio of an island portion of the sea-island structure per unit area on an observation surface of the layer made of a thermosetting resin composition is 10% or more to 45% or less, and wherein the thermosetting resin composition contains at least one of a cyanate resin and an unsaturated imide resin.

2. The prepreg according to claim 1, wherein the modified silicone oil or the compound having a skeleton derived from a modified silicone oil has a dimethyl silicone skeleton in the molecular structure thereof.

3. The prepreg according to claim 1, wherein the modified silicone oil or the compound having a skeleton derived from a modified silicone oil has a reactive group in the molecular structure thereof.

4. The prepreg according to claim 1, wherein a blending amount of the modified silicone oil or the compound having a skeleton derived from a modified silicone oil is 2 parts by mass or more to 80 parts by mass or less based on 100 parts by mass of a total blending amount of a thermosetting resin constituting the thermosetting resin composition and a curing agent to be optionally added.

5. The prepreg according to claim 1, wherein the fiber substrate is a glass cloth.

6. The prepreg according to claim 1, wherein the thermosetting resin composition further contains an epoxy resin.

7. The prepreg according to claim 1, wherein the thermosetting resin composition further contains an inorganic filler.

8. The prepreg according to claim 1, wherein the phase separation structure at a magnification of 2,000 times can be confirmed in the surface observation using an electron microscope.

9. The prepreg according to claim 1, having a fine phase separation structure to such an extent that in the surface observation using an electron microscope, the phase separation structure cannot be confirmed at a magnification of 2,000 times, but the phase separation structure can be confirmed at a magnification of 10,000 times.

10. The prepreg according to claim 8, wherein a number of island portions of the sea-island structure with a phase separation scale of 1.0 µm or more is 5 or more per 20 µm×20 µm in the surface observation using an electron microscope at a magnification of 2,000 times.

11. The prepreg according to claim 10, wherein a number of island portions of the sea-island structure with a phase separation scale of 20 nm or more is 2 or more per 200 nm ×200 nm in the surface observation using an electron microscope at a magnification of 10,000 times.

12. A laminate prepared by lamination and molding using the prepreg according to claim 1.

13. A printed wiring board manufactured by using the laminate according to claim 12.

14. The prepreg according to claim 6, wherein the thermosetting resin composition contains an inorganic filler.

15. The prepreg according to claim 1, wherein the cyanate resin is a novolak cyanate resin and the unsaturated imide resin is a bismaleimide resin.

16. The prepreg according to claim 1, wherein the island portion of the sea-island structure has a different elastic modulus than that of the sea portion of the sea-island structure.

17. The prepreg according to claim 1, wherein the modified silicone oil or the compound having a skeleton derived from a modified silicone oil has a linear siloxane skeleton and also has hydrogen or a group other than a hydrocarbon group in a molecular structure thereof.

18. The prepreg according to claim 1, wherein the modified silicone oil or the compound having a skeleton derived from a modified silicone oil has a reactive group in the molecular structure thereof, capable of reacting with a thermosetting resin of the thermosetting resin composition.

19. The prepreg according to claim 18, wherein the modified silicone oil or the compound having a skeleton derived from a modified silicone oil, having said reactive group, also has a dimethyl silicone skeleton in a molecular structure thereof.

20. The prepreg according to claim 1, wherein the modified silicone oil is contained in the sea portion of the sea-island structure.

21. The prepreg according to claim 1, wherein the island portion and the sea portion of the sea-island structure have partially reacted with each other.

22. A prepreg comprising a fiber substrate and a layer made of a thermosetting resin composition, wherein the layer made of the thermosetting resin composition contains a modified silicone oil or a compound having a skeleton derived from a modified silicone oil, and the layer made of a thermosetting resin composition has a phase separation structure, said phase separation structure being a sea-island structure,
   wherein an occupying area ratio of an island portion of the sea-island structure per unit area on an observation surface of the layer made of a thermosetting resin composition is 10% or more to 45% or less,
   wherein the thermosetting resin composition contains at least one of a cyanate resin and an unsaturated imide resin, and
   wherein the modified silicone oil is a silicone oil modified with an epoxy group, a hydroxyl group, a methacryl group, a mercapto group, a carboxyl group, an alkoxy group or a silanol group.

* * * * *